United States Patent [19]
Jaross

[11] 3,830,095
[45] Aug. 20, 1974

[54] GAS VOID DETECTOR FOR LIQUID METAL

[75] Inventor: Robert A. Jaross, Sandwich, Ill.

[73] Assignee: The United States of America as represented by the United States Atomic Energy Commission, Washington, D.C.

[22] Filed: June 26, 1973

[21] Appl. No.: 373,713

[52] U.S. Cl. .................. 73/19, 73/61 R, 176/19 R, 340/239 R
[51] Int. Cl. ............................................ G01n 7/00
[58] Field of Search .......... 73/61 LM, 61 R, 61.1 R, 73/19, 53, 194 R, 198; 176/19 R; 340/239 R

[56] References Cited
UNITED STATES PATENTS 3,060,722  10/1962  Midgal et al. ........................ 73/19
3,683,272  8/1972  Vissers et al. ....................... 73/19 X
3,738,154  6/1973  Henry ................................... 73/19

FOREIGN PATENTS OR APPLICATIONS
7,013,619  4/1971  Netherlands .................... 176/19 R
238,220   7/1969  U.S.S.R. ............................ 73/61 R Primary Examiner—Richard C. Queisser
Assistant Examiner—Joseph W. Roskos
Attorney, Agent, or Firm—John A. Horan; Arthur A. Churm; Paul A. Gottlieb

[57] ABSTRACT

Detection of gas voids in a liquid metal is accomplished by pumping the liquid metal through a flowmeter with an electromagnetic pump. The flowmeter measures the rate of flow of the liquid metal which decreases with the presence of gas voids in the liquid metal. When the flow rate is reduced because of the presence of such gas voids an alarm signal is generated.

7 Claims, 2 Drawing Figures

GAS VOID DETECTOR FOR LIQUID METAL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In systems using conductive liquids, such as liquid-sodium-cooled nuclear reactors, it is necessary to have an indicator of the presence of gas entrained within the liquid metal. In such reactors, gas so entrained is symtomatic of various types of problems such as water-sodium leaks in the steam generation apparatus, fission gases released from failed fuel elements, or gas entrained at the gas-liquid interface of sodium systems. Additional stress is placed on the instrumentation because of the highly corrosive, high-temperature environment of the liquid metal reactor. Thus, any gas void detection system capable of use in this environment must be rugged and reliable.

Other gas void detectors, including monitoring the change in resistivity of the liquid metal, which varies if gas voids are present, and acoustical sensing, which "hears" the gas voids, develop very small signals, require much cumbersome instrument support, which reduces reliability, and are not sensitive to low concentrations of gas.

It is therefore an object of this invention to provide an improved detector of gas voids entrained within a liquid metal.

Another object of this invention is to provide a gas void detector having high sensitivity to low concentration of gas within a liquid metal.

Another object of this invention is to provide a gas void detector having sufficient reliability and ruggedness to be operable in the severe environment of liquid-metal-cooled nuclear reactor systems.

BRIEF DESCRIPTION OF THE INVENTION

A liquid metal is pumped by an electromagnetic pump through a flowmeter. Without gas voids present within the liquid metal a particular constant flow rate is maintained by the electromagnetic pump, but when gas voids are present within the liquid metal the flow rate measured by the flowmeter will fall below the particular constant rate. An alarm signal is generated when the flow rate falls to a predetermined level, indicating that gas voids are present within the liquid metal.

DETAILED DESCRIPTION OF THE INVENTION

Figure 1:
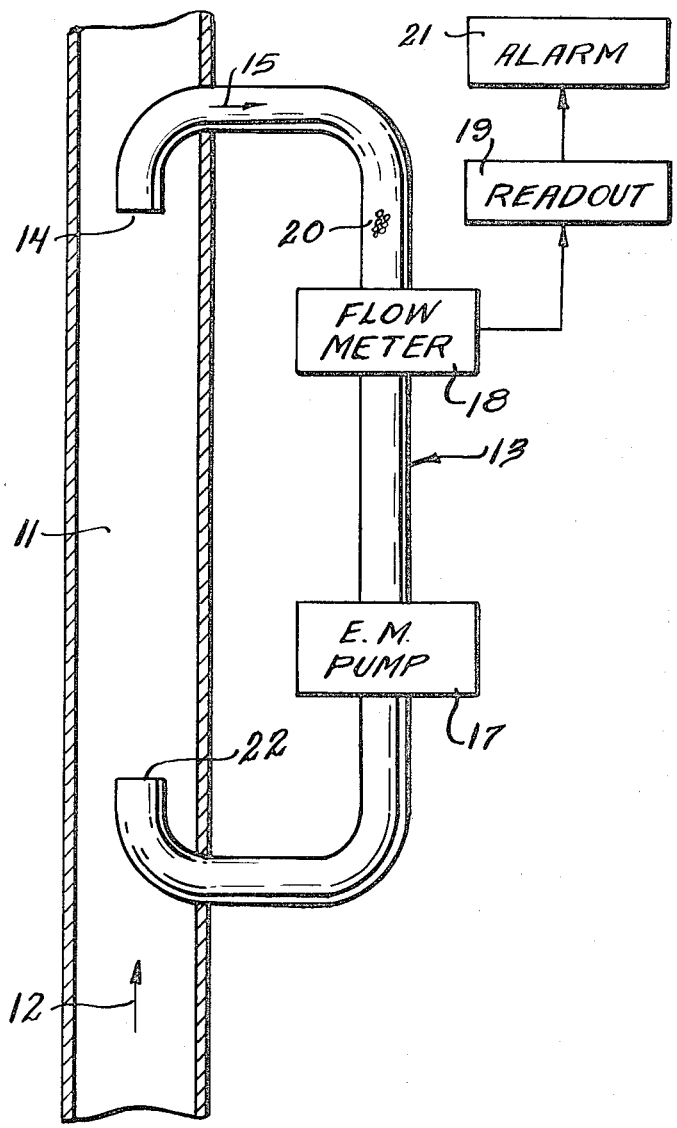
FIG. 1 shows the gas void detector system positioned in a sample line off a main supply line carrying liquid metal.

Referring to FIG. 1, a main supply of liquid metal, such as is found in liquid-sodium-cooled nuclear reactors, is confined in main supply conduit 11, and is flowing in the direction of arrow 12. A sampling line 13 is positioned with its inlet 14 within main supply conduit 11. A portion of liquid metal will therefore flow through sampling line 13 in the direction of arrow 15. It has been observed that gas voids entrained within the main supply of liquid metal tend to move in the cneter of the flow. By positioning the inlet 14 of sampling line 13 at the center of main supply conduit 11, a higher percentage of gas voids may be directed through sampling line 13 and better detection achieved.

The liquid metal sample within sampling line 13 is acted upon an an electromagnetic pump 17. An electromagnetic pump is a well-known device which will exert force upon a conductive fluid. The pump may accomplish this by imposing a magnetic field perpendicular to and through the flow of the conductive fluid. Electrodes contacting the fluid provide a current flow through the fluid perpendicular to the magnetic field. This current flow therefore will exert a force on the fluid within the magnetic field. Another type of common electromagnetic pump is one in which a moving magnetic field is applied to the conductive fluid with the effect that the fluid will move with the moving field. These pumps can be of either a.c. or d.c. type, either of which is applicable to the disclosed invention.

The liquid metal is pumped by electromagnetic pump 17 through flowmeter 18. The rate of flow of the liquid metal generated by electromagnetic pump 17 is measured by flowmeter 18 which is a conventional device capable of continually measuring the rate of flow of a fluid through a conduit. Flowmeter 18 is provided with readout means 19 so that the rate of flow measured can be monitored. Note that the respective order of the flowmeter and the electromagnetic pump along the path of flow of the liquid metal is immaterial to the practice of the invention.

Ordinarily the rate of flow generated by electromagnetic pump 17 is relatively constant, but the presence of gas voids 20 in the liquid metal sample will reduce the rate of flow and therefore the measured value read from flowmeter 18. If the rate of flow measured by flowmeter 18 falls to a predetermined level, an alarm signal can be generated by alarm instrumentation 21 which monitors the readout measurements of flowmeter 18. The sample of liquid metal in sampling line 13 is discharged into the main supply of liquid metal at sampling line outlet 22.

Figure 2:
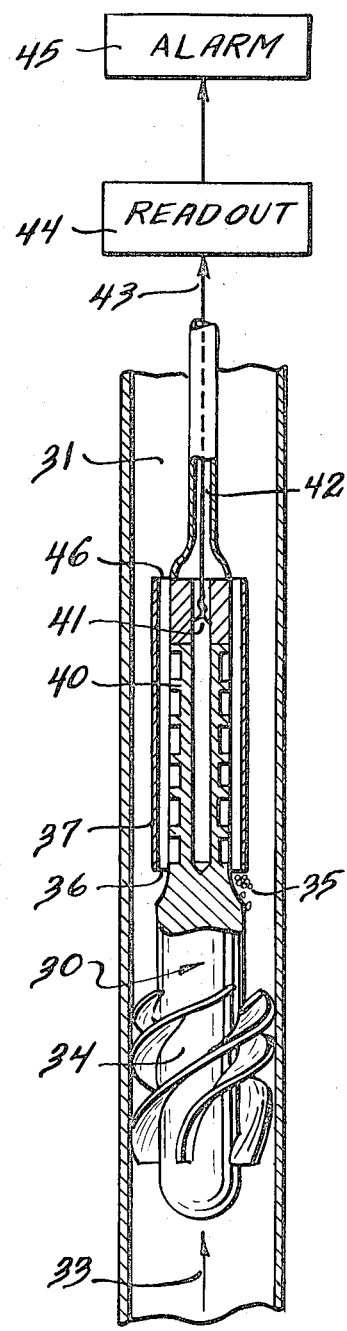
FIG. 2 shows the gas void detector incorporated within the main supply line.

Referring to FIG. 2, there is shown gas void detector 30 incorporated within main supply conduit 31 which contains the main supply of liquid metal flowing in the direction of arrow 33. Here the gas void detector 30 includes a centrifugal gas concentrator 34. Concentrator 34 is a device which introduces circumferential motion to the liquid metal and has the effect by centripetal force of concentrating the gas voids toward the center of the heavier liquid metal. Therefore concentrator 34 tends to concentrate gas voids 35 at the inlet 36 of sampling line 37. Within sampling line 37 is electromagnetic pump 40 which in this embodiment is represented as an a.c. linear induction type pump which operates in the moving magnetic field mode described above. After pump 40, there is positioned a flowmeter 41 which measures the rate of flow generated by electromagnetic pump 40. Lead wires (not shown) for electromagnetic pump 40 and flowmeter 41 and instrumentation connections 43 for monitoring the readout measurements of flowmeter 41 are carried via central chamber 42 to readout means 44 and alarm instrumentation 45 which function as in the embodiment of FIG. 1. The sampled liquid metal is returned to the main supply at outlet 46.

In practice, a 17 percent reduction in flow rate was observed where the concentration by volume of gas was 76.5 ppm and a 28 percent reduction in flow rate was observed for a concentration of 98 ppm. Even small concentrations on the order to 37 ppm which produce a 5 percent reduction in rate of flow are detectable by the invention. In part this is due to the high sensitivity of the electromagnetic pump to entrained gas and in part to the magnitude of the output signal developed by the device which is much larger than the magnitude developed by prior art devices. With prior art devices, amplification and readout of the feeble output signal required cumbersome, expensive equipment which by its own complexity introduced extraneous error into the output, thereby limiting sensitivity. The larger output signal produced by the disclosed device limits extraneous error introduced by amplification and readout equipment, and limits the amount of equipment required.

The embodiments of the invention in which an exclusive property or privilege is claimed are defined as follows:

1. A method for detecting gas voids in a liquid metal having entrained gas therein, including the steps of:
   a. pumping the liquid metal through flow rate measuring means with an electromagnetic pump;
   b. measuring with said flow rate measuring means the flow rate of the liquid metal produced by said pumping; and
   c. developing an alarm signal by the flow rate measuring means in response to a reduction in said flow rate below a predetermined level.

2. The method of claim 1, wherein the liquid metal is in a main conduit, further including the step of diverting the liquid metal from said main conduit via a first conduit to said electromagnetic pump and flow measuring means.

3. The method of claim 2, further including the step of applying centripetal force to said liquid metal at the inlet of said first conduit to concentrate gas voids at the inlet of said first conduit.

4. A device for detecting gas voids in a liquid metal having gas entrained therein, comprising: a first conduit containing the liquid metal, an electromagnetic pump and flow rate measuring means, each coupled in series with said first conduit and through each of which the liquid metal passes, said electromagnetic pump acting to pump said liquid metal through said flow rate measuring means, said pumping by said electromagnetic pump being inhibited by the entrained gas in the liquid metal to reduce the rate of flow thereof, readout means coupled to said flow rate measuring means and responsive thereto to develop an output corresponding to the rate of flow measured by said flow rate measuring means and alarm means coupled to said readout means and responsive to said output of said readout means to develop an alarm signal with said output below a predetermined level.

5. The device of claim 4, further including a main conduit containing a main supply of liquid metal, said first conduit being coupled to said main conduit so that a portion of said main supply of liquid metal is diverted through said first conduit to said electromagnetic pump and said flow rate measuring means.

6. The device of claim 5, wherein said electromagnetic pump and said flow rate measuring means are installed entirely within said first conduit and said first conduit is installed entirely within said main conduit.

7. The device of claim 6, further including a gas concentrator having vanes extending therefrom, said gas concentrator being installed within said main conduit upstream from and adjacent to the inlet of said first conduit and imparting circumferential motion to said liquid metal by the interaction of said vanes with said liquid metal, said circumferential motion of said liquid metal acting to apply centripetal force to said gas voids entrained within said liquid metal, thereby concentrating said gas voids at the inlet of said first conduit.

* * * * *